United States Patent Office 2,849,281
Patented Aug. 26, 1958

2,849,281

ORGANIC EXTRACTANT AND METHOD OF SOLVENT EXTRACTING MINERAL VALUES

Robert F. McCullough, Glenview, Ill., assignor, by mesne assignments, to the United States of America as represented by the United States Atomic Energy Commission No Drawing. Application July 6, 1955
Serial No. 520,379

9 Claims. (Cl. 23—14.5)

This invention relates to the preparation of phosphate compounds. More particularly, it relates to the preparation of esters of phosphoric acid. Still more particularly, it relates to stable phosphoric acid reaction products which are useful as extractants of uranium from solutions containing same.

Formation of esters by the interaction of $P_2O_5$ with alcohols is well known. Generally, the physical characteristics and the properties governing the use depend upon the type of alcohols reacted with $P_2O_5$. Esters formed by the interaction of monohydric alcohols with $P_2O_5$ are known to have an affinity for uranium present in phosphate solutions. These esters are prepared by the addition of the alcohol to kerosene or other solvent and then adding $P_2O_5$ in quantities to give a $ROH/P_2O_5$ mol ratio of about 2:1. After addition of $P_2O_5$, mixing is continued for about one hour.

Esters prepared from alcohol such as diisobutyl carbinol are effective for removing uranium from phosphate solutions when ester preparation temperatures have been low, i. e., below about 30° C. and the ester used shortly after being prepared. When ester preparation temperatures exceed about 40° C., uranium extraction efficiency from reduced solutions falls off to a commercially unsatisfactory level normally within ten days. Further, when esters are prepared at reaction temperatures above 25° C., the ester loses its ability to extract uranium from unreduced phosphate solutions after about eight hours. This instability and rapid degradation as an extractant has been a strong deterrent to comercial acceptance of solvent extraction processes for the recovery of uranium values from phosphate solutions. In addition, according to previous systems, the uranium has been recovered as $UF_4$ and the contact with acidic HF solutions has added to the degradation of the organic solvent.

It is a primary object of this invention to overcome the shortcomings and disadvantages of processes heretofore in use.

It is another object of this invention to produce stable improved extractant material.

It is still another object of this invention to provide a method of preparing stable extractant solvents.

It is still another object to provide extractant material which maintains its efficiency over an extended period of time.

It is still another object of this invention to recover uranium by an improved method from clear aqueous or slurry phases.

These and other objects of the invention will be apparent to those skilled in the art from the following description.

In the preparation of stable extractants in accordance with the present invention, a saturated monohydric alcohol is reacted with phosphoric anhydride in a $ROH/P_2O_5$ mol ratio in the range between about 1.5:1 and about 2.5:1 with or without organic solvent such as kerosene, benzene, ether, trichlorethylene or the like. Normally the predominate reaction products are pyro- and/or ortho phosphoric acid esters. The $ROH/P_2O_5$ reaction product is neutralized with a basic reactant, such as gaseous ammonia, concentrated ammonium hydroxide, magnesium hydroxide and alkali metal hydroxides and then acidified with aqueous sulfuric acid to reestablish the extractant in the ester form. Upon proper acidification and standing, two phases, an organic phase and an aqueous phase, separate. Ester material in the organic phase is active extractant for uranium. Ester material soluble in the aqueous phase has substantially zero value as an extractant or is inactive.

This active organic ester material as dissolved in the extender, for example, kerosene, is ready for use in extracting uranium. Generally, the reaction is under such conditions that the extractant is present in kerosene solution to the extent of about 5% to about 15% by volume, although reactions can be carried on such that lower or higher concentrations of active extractant will be present. The organic mixture, i. e., kerosene plus ester, with or without adjustment of the concentration of the active extractant material is brought into intimate contact with aqueous phosphate solution and then the materials allowed to separate into an aqueous phase and an organic phase rich in uranium values. Continuous extraction is usually carried out in multistage countercurrent extractors, such as mixer-settlers, mixer-columns, pulse-columns, Podbielniak and other centrifugal extractors similar to the Sharples Nozzl-Jector units.

Useful monohydric alcohols which will react with $P_2O_5$ to form uranium extractants are the saturated monohydric alcohols of the general formula R—OH wherein R is a radical selected from the group consisting of primary and secondary alkyl radicals having 6 to 18 carbon atoms, such as hexyl alcohol, n-octanol, octanol-2, 2-ethyl hexanol, diisobutyl carbinol, decyl alcohol and tridecyl alcohol.

Reaction of alcohol and $P_2O_5$ is carried out at suitable temperature for periods varying from about one-fourth hour to about forty-eight hours with from one to three hours reaction time normally preferred. Reactants and organic diluents, or extenders, used preferably are as void of water as possible. Phosphorus anhydride should be used in as complete of a dry atmosphere as is possible. Addition of $P_2O_5$ to alcohol gives an exothermic reaction and cooling is used to maintain suitable temperature control. Mixing ease and temperature control normally is easier when the ester is diluted to 10% volume for volume using an extender, such as kerosene.

This range of reaction temperatures, when the ester is to be ammoniated and reacidified, is broader than in the normal operation and generally extends from about 0° C. to about 45° C. with temperatures in the range between about 15° C. and about 25° C. preferred. Esters prepared at 40° C. using diisobutyl carbinol, at a $ROH/P_2O_5$ mol ratio of 2.0 and extended in kerosene to give a 10% volume for volume were ammoniated with 16 parts aqueous ammonia (29%) per 100 parts ester, aged and acidified to a pH of about one. For material which had aged 10 days in the ammoniated state 88% $U_3O_8$ extraction was obtained upon a one-stage contact of the organic phase with reduced phosphoric acid at an aqueous to organic volume phase ratio of 10. Ester prepared at 15° C. and treated identical to the above showed 87% extraction.

After the esterification reaction, the ester may be aged for up to about forty-eight hours before ammoniation. Preferably a reacted mixture is aged for between about three and about twenty-four hours before ammoniating, if ammoniation is the neutralization reaction used to stop the esterification reaction. Comparison of esters, prepared at 40° C. using diisobutyl carbinol at a ROH/P₂O₅ mol ratio of 2.0, which have not been neutralized and reacidified, with the active esters recovered aftre neutralization with excess aqueous ammonia and reacidification (18% H₂SO₄) was carried out by one-stage contacting of reduced phosphoric acid solution with 10% initial ester concentration at an aqueous to organic phase ratio of 10:1, by volume, at room temperature. Extraction results were as follows:

TABLE I

*Uranium extraction using as prepared and ammoniated esters*

| Ester Age (Hrs.) When Ammoniated | Percent $U_3O_8$ Extraction (to organic phase) at Organic Age Indicated, Days | | | |
|---|---|---|---|---|
| | 1 | 10 | 20 | 30 |
| 0.1 | | 92 | 93 | 92 |
| 1 | | 93 | 92 | 92 |
| 3 | | 88 | 93 | 85 |
| 24 | | 92 | 93 | 89 |
| 48 | | 91 | 89 | 89 |
| 72 | | 88 | 89 | |
| Untreated | 78 | 35 | 10 | 5 |

These data show that esters which have been ammoniated not only give initially higher extractions than the untreated esters, but also maintain this high level for very long periods of time.

Neutralization of the ROH/P₂O₅ reaction mixture is carried to a pH in the range of about 5 to about 9.5. To effectively prepare an active ester, it is preferred that the ester be neutralized to a point above neutral pH if the ammoniated product is to be stored for an extended period, particularly at elevated temperatures, i. e., 80° C. storage conditions. The higher the ester preparation temperature, for example, 40° C., for which extraction efficiency was quoted, the higher the pH which it is desirable to effect.

When for example, an ester has been prepared by reacting diisobutyl carbinol with P₂O₅ at 15° C. at a mol ratio of approximately 2:1 to give an ester concentration of 10% volume for volume and the reaction product was neutralized with, for example, ammonium hydroxide, sodium hydroxide, potassium hydroxide, magnesium hydroxide and calcium hydroxide and the product reacidified with 18% sulfuric acid, the various reaction products upon contact with reduced phosphoric acid at a 10 to 1 aqueous to organic volume ratio give the following results:

TABLE II

*Neutralization of esters with other bases*

| Bases Added | Percent $U_3O_8$ Extraction at Time Indicated, Days | |
|---|---|---|
| | 14 | Average of 14 |
| NH₄OH | | 93.4 |
| NH₃ | | 94.9 |
| NaOH | | 94.6 |
| NaOH | | 93.7 |
| KOH | | 94.0 |
| Mg(OH)₂ | | 89.5 |
| Ca(OH)₂ | 27.3 | (¹) |

¹ Not an average.

After addition of sufficient neutralization agent and sufficient aging, the organic material is acidified with an aqueous solution of sulfuric acid, hydrochloric acid, nitric acid, phosphoric acid, acetic acid and the like to a pH below 3 and preferably in the range of about pH 1 to about 2. Acidification is usually made by means of a dilute sulfuric acid at room temperature generally in the range of about 10% acid to about 60% acid, although concentrations of acid outside of this range may be used if some degradation of the solvent is to be tolerated.

Stability of esters after neutralization, for example, ammoniation and reacidification, was tested by aging esters, acidified five days after ammoniation, for twenty-four days. These aged 5% volume for volume esters were then contacted with reduced phosphoric acid at an aqueous to organic phase ratio of 10:1 to extract uranium and the uranium precipitated from the organic as UF₄, although in the table below it is reported on the analytical basis of U₃O₈.

TABLE III

*Uranium extraction using ammoniated and acidified esters*

| Ester age (hrs.) when ammoniated: | Percent $U_3O_8$ extraction |
|---|---|
| 0 | 67 |
| 1 | 72 |
| 3 | 78 |
| 24 | 82 |
| 48 | 79 |
| 72 | 76 |

Results show that the extraction efficiency after 24 days aging was only slightly reduced from the efficiency obtained immediately after acidification.

Esters prepared at ROH/P₂O₅ mol ratios between about 1.5:1 and about 2.25:1, in kerosene such that a 10% ester concentration results in the final reaction product, normally gives analyses varying between about 30 grams per liter and about 40 grams per liter P₂O₅. Upon contacting this reaction product intimately with water an equilibrium pH in the aqueous phase of about 1.4 normally results. Under these conditions of equilibration, when the ester has been made under optimum conditions previously stated, about 35% of the P₂O₅ content is removed to the aqueous phase. Material, in the aqueous phase, as has been previously stated, does not extract uranium. Further removal of inactive ester, so far as uranium extraction is concerned, can be effected through neutralization with a basic material, such as ammonia or ammonium hydroxide, by neutralization to a proper acidic condition.

Table 4 following shows the effect of pH on P₂O₅ removed from a freshly prepared ester to the aqueous phase at various pH values using aqueous ammonium hydroxide addition to a 10% (volume basis) diisobutyl carbinol ester of phosphoric acid.

TABLE IV

*P₂O₅ removal from organic to aqueous phase*

| pH of aqueous phase: | Percent of total $P_2O_5$ in organic phase |
|---|---|
| 1.4 | 65 |
| 2.5 | 60 |
| 3.0 | 55 |
| 3.75 | 49 |
| 4.25 | 40 |
| 4.5 | 30 |
| 4.75 | 2 |
| 9.0 | 2 |

The quantity of P₂O₅ removed at any given pH value will vary somewhat depending upon the ROH/P₂O₅ mol ratio used during the initial ester preparation, as well as alkali metal hydroxide used for neutralization. Ammonium, potassium, and sodium hydroxides exhibit similar curve characteristics. Magnesium and calcium hydroxides are appreciably different.

It has been found that almost complete removal, to the aqueous phase, of the inactive ester normally is accomplished when the P₂O₅ content of an initially prepared 10% ester is reduced to between about 17 gs. and about 22 gs. per liter P₂O₅ by pH adjustment with ammonia.

Normally the initially prepared ester is neutralized to an equilibrium pH of about 3.75 and the phases separated at this point. Reacidification of the aqueous phase to about pH 1.5 will permit recovery of an organic phase, which is inactive for uranium extraction. The organic phase from the pH 3.75 separation may be used directly or may be reacidified for use in extracting uranium from aqueous phosphate solutions as hereinbefore explained.

The physical characteristics of the ester during neutralization will vary considerably depending upon the basic material used in neutralization as well as the time of standing after neutralization and the alcohol initially used to make the ester. For example, in the case of diisobutyl carbinol, prepared as a 10% ester (volume basis) and at a $ROH/P_2O_5$ mol ratio to 1.8, addition of aqueous ammonia (29% $NH_3$) to give a pH of about 9 will initially give a solids free mixture. Upon standing, however, the mixture thickens and a solid phase, thought to represent the ammonia salt of the active uranium extractant, exists as a solid paste-like phase. Potassium and sodium hydroxides, when used as saturated solutions at room temperature and when neutralized to points above neutrality, give solid phases immediately and show little change with time.

In most cases when using the soluble alkali metal hydroxides a point is reached in the pH scale, normally pH between about 4 and about 6, where all phases are substantially completely miscible.

In the process of extracting uranium from acidic solution, for example, phosphoric acid solution obtained by digesting Florida phosphate ore with sulfuric acid, alum, if $Al_2O_3$ is present in appreciable quantities, is separated first. To accomplish this, the acidic solution is treated with a sulfate or ammonia, i. e., ammonium sulfate or ammonium acid sulfate. Maximum yield of ammonium alum crystals is obtained by proper correlation of time and temperature and ratio of $Al_2O_3$ to $SO_4$. Crystallizing time may be as long as 24 hours but for economic commercial separation, 2 to 4 hours is satisfactory.

After aluminum removal, acidic solution is next subjected to uranium recovery by the use of a liquid-liquid solvent extract system using the active extractant described herein before. Preferably, the liquor is contacted for solvent extraction of uranium after a reduction reaction by electrolytic means or by chemical reaction, such as, the treatment with powdered metallic iron, aluminum and the like.

The uranium recovery operation consists, for example, of agitating the liquor-metallic iron slurry for several minutes. The iron content of the slurry may be varied from about 0.1 gram to about 8 grams per gallon of liquor, preferably about 2 grams. The slurry is then subjected to a liquid-solid separation to remove unreacted metal. This may be accomplished through the use of a filter, centrifuge, cyclone, or other suitable separation device.

Liquor having a more reduced solution potential, i. e., about 100 mv. on the oxidation side, is then brought into intimate contact with the above described organic solvent having an affinity for uranium values. This organic solvent normally present in such extender material as kerosene, benzene, mineral spirits, toluene and the like, in which the esters have at least limited miscibility, may have the concentration of the extractant vary from about 1% to about 90%, preferably between about 5% and about 10%. The volume of aqueous solution to solvent may vary within wide limits, for example, between about 1:1 and about 40:1, and preferably between about 5:1 and about 20:1. It is preferred to contact the organic solvent with a liquor at temperatures between about room temperature and about 60° C., preferably about 20° C. In this connection it has been found that the esters which have undergone a neutralization reaction are more stable and give higher extractions than those esters which are used on an as-prepared basis at high temperatures.

After agitation and contacting of the two materials, i. e., aqueous acidic solution and organic solvent to effect intimate contact, the materials are allowed to separate whereby two distinct phases are formed, namely, an aqueous phase and an organic phase rich in uranium values.

To recover the uranium from the organic phase, the organic phase, normally when uranium has been extracted from a solution high in calcium content such as a solution of monocalcium phosphate, is mixed with about 18% sulfuric acid in quantities sufficient to precipitate substantially all calcium as calcium sulfate, i. e., equal volumes of 18% sulfuric acid and organic phases. Upon removal of the aqueous phase, together with the contained gypsum solids, the solvent containing uranium is neutralized with aqueous ammonium hydroxide to a pH between about pH 5 and about pH 9, normally about pH 7 and the aqueous removed. The organic phases then are contacted with aqueous solutions containing between about 10% and about 15% ammonium bicarbonate. This contact normally is less than about 5 minutes in duration at room temperature and with aqueous to organic phase ratios between about 3:1 and about 1:3, normally 1:1 in either a continuous or batch system as, for example, in mixer settler or centrifugal separators. The bicarbonate solution has a high affinity for uranium and almost complete removal of uranium from the organic phase is effected. The organic phase, upon removal of uranium and separation from the aqueous phase, is recycled to the initial portion of the circuit where it is contacted with freshly reduced aqueous solutions containing uranium. The organic phase prior to recycle preferably is acidified with sulfuric acid to the acid ester state.

After intimate contact the aqueous bicarbonate phase is permitted to separate from the organic solvent phase. Stripped organic solvent phase containing, for example, the phosphoric acid ester of diisobutyl carbinol (2,6 dimethyl heptanol-4) is adjusted in pH back to approximately 1 utilizing a suitable acid such as was used for reacidification and the organic phase returned to the extraction system for recycle into contact with, for example, reduced phosphoric acid solution. By reduced phosphoric acid solution is meant an aqueous solution which has been subjected to a reduction reaction either by electrolytic means or by chemical reaction such as by treatment with powdered metallic iron, aluminum and the like, such that the solution potential has been reduced below approximately about 150 mv. which is generally from about 300 mv. down to approximately 100 mv.

Aqueous bicarbonate phase is treated by suitable means to separate uranium solids. After solids separation, the ammonium bicarbonate solution is passed over solid ammonium bicarbonate or ammonia and/or carbon dioxide gases introduced to insure that the solution is kept in balance before recycle to the uranium precipitation step.

Satisfactory uranium extraction has been obtained using active phosphoric acid esters from reduced and unreduced aqueous solutions and slurries of monocalcium phosphate, wet-process phosphoric acid, phosphoric acid high also in aluminum sulfate content, as well as from uranium containing acid solutions having high sulfate, chloride and nitrate ions.

The invention is further illustrated by the following examples which are given by way of illustration and without any intention that the invention be limited thereto.

EXAMPLE I 26.2 parts by weight of 2-ethyl hexanol-1 added to 364 parts by weight of kerosene. The mixture was at room temperature of approximately 20° C. To the mixture was added 14.2 parts by weight of phosphorus pentoxide which gives an $ROH/P_2O_5$ mol ratio in the final product of approximately 2.0:1. Addition was made continuously and slowly over a period of about 5 minutes and the mixture was stirred for approximately 1 hour and then aged for approximately 3 hours to give a reaction product containing about 30 gms. per liter $P_2O_5$.

The kerosene-ester organic solvent for uranium having about 10% by volume of ester was separated into two portions, A and B. Portion B constituting about ⅔ of the original solution was neutralized to pH 7.5 using 4 parts by volume of concentrated ammonium hydroxide (29% $NH_3$) per 100 parts by volume of 10% ester. The neutralized solvent was allowed to stand for 5 days and then was reacidified to a pH of approximately 1.0 using 18% sulfuric acid solution and the organic phase recovered.

EXAMPLE II

About 10 tons per hour of Florida phosphate rock was ground to a particle size approximately 62% of which passed through a 200 mesh standard screen. This ground rock analyzed about 67% B. P. L. The ground rock was slurried with about 8.3 tons per hour of about 98% sulfuric acid added as approximately 54° Bé. aqueous solution. The slurry was digested for approximately 6 hours.

Upon completion of the digestion, the undissolved solids were filtered out and a phosphoric acid obtained having approximately 26% $P_2O_5$, 0.35% CaO and 0.014% $U_3O_8$. This solution being low in aluminum content was ready for extraction. The solution was divided into two portions, D and E.

Portion E of the solution was treated with approximately 1 pound of powdered metallic iron per 20 gallons of solution and agitated for about 30 minutes after which the solids were filtered from the liquid. The solution, in which the uranium is now substantially all in the tetravalent state, was then intimately contacted with approximately one gallon of ammoniated and reacidified portion B from Example I per 10 gallons of reduced solution E in a countercurrent liquid-liquid extraction system. The intimate contact was maintained for about one to two minutes per stage and then allowed to separate to form an organic and extracted aqueous phase. This aqueous phase was processed to recover valuable constituents which form no part of the present invention.

The organic solvent phase now rich in extracted uranium was treated with about 100 gallons of 18% sulfuric acid per 100 gallons of organic solvent. The aqueous phase containing precipitated $CaSO_4$ were separated from the organic phase and recycled, after $H_2SO_4$ make up, for subsequent processing.

Calcium free organic solvent was then intimately contacted with an equal volume of aqueous ammonium hydroxide such that an end pH of about 7.0 resulted. The aqueous phase was separated and discarded.

Substantially free calcium organic solvent now neutralized was then intimately contacted with an equal volume of a 15% solution of ammonium bicarbonate (12 gm./ml.) for about 5 minutes at a temperature of about 30° C.

After contact, the mixture was allowed to separate and form an aqueous bicarbonate phase and an organic phase. Organic phase was adjusted to a solution pH of about 1 using sulfuric acid and the organic solvent returned to the extraction system.

Aqueous bicarbonate phase and precipitated $U_3O_8$ from electrolytic reduction were separated by filtration, the aqueous solution adjusted in ammonia and carbon dioxide content, and recycled for subsequent contact with low calcium neutralized uranium containing organic solvent.

About 0.22 pound of uranium precipitate of approximately 60% $U_3O_8$ content was recovered from 1,000 pounds of treated aqueous solution.

EXAMPLE III

Portion D of the solution of Example II was treated with approximately 1 pound of powdered metallic iron per 20 gallons of solution and agitated for about 30 minutes, after which the solids were filtered from the liquid. The reduced solution was then intimately contacted with portion A of the organic solvent after 5 days of aging of Example I according to procedure discussed in Example II and the $U_3O_8$ precipitated and recovered in the identical apparatus and under the same conditions as in Example II.

About 0.10 pound of uranium precipitate of approximately 60% $U_3O_8$ content was recovered from 1000 pounds of treated solution.

Comparison of recoveries of $U_3O_8$ in Examples II and III show that the ammoniated and reacidified organic solvent extracts substantially twise as much uranium for the same number and time of contacts as esters not so treated.

Having thus described my invention, what I claim is:

1. A process for preparing phosphate esters useful for extracting tetravalent uranium from an acidic aqueous solution thereof which comprises reacting a saturated monohydric alcohol of the general formula R—OH wherein R is selected from the group consisting of primary and secondary alkyl radicals containing from 6 to 18 carbon atoms with phosphorus pentoxide, adjusting the reaction product to a pH above about 5, acidifying the adjusted product to a pH below about 3, extracting the organic-soluble materials from the acidified product with an organic solvent, and separating the resulting organic phase, containing the desired phosphate esters, from the aqueous phase.

2. An extractant having an affinity for tetravalent uranium dissolved in an acidic aqueous solution, prepared according to the method of claim 1.

3. A process for preparing phosphate esters useful for extracting tetravalent uranium from an acidic aqueous solution thereof which comprises dissolving a saturated monohydric alcohol of the general formula R—OH wherein R is selected from the group consisting of primary and secondary alkyl radicals contining from 6 to 18 carbon atoms in an organic solvent, adding to the solution phosphorus pentoxide, maintaining the resultant mixture at a temperature between about 0 and about 45° C. for a reaction period of up to about 48 hours, adjusting the reaction product to a pH between about 5 and about 9.5 with an agent selected from the group consisting of ammonia, ammonium hydroxide, and alkali-metal hydroxides, acidifying the adjusted product to a pH between about 1 and about 2, and separating the resulting organic phase, containing the desired phosphate esters, from the aqueous phase.

4. A process for preparing phosphate esters useful for extracting tetravalent uranium from an acidic aqueous solution thereof which comprises dissolving diisobutyl carbinol in kerosense, reacting the carbinol with phosphorus pentoxide in a molar ratio of 1:1, adjusting the reaction product with ammonium hydroxide to a pH above about 5, acidifying the resulting ammonium salt solution with an aqueous solution of sulfuric acid to a pH below about 3, and separating the organic phase, containing active, stable phosphate ester, from the aqueous phase.

5. A process as in claim 4 wherein the reaction of carbinol and phosphorus pentoxide is carried out at a temperature between about 0 and about 45° C.

6. A process as in claim 5 wherein the reaction product, after adjustment with ammonium hydroxide, is aged before acidification.

7. A process for recovering tetravalent uranium from an acidic aqueous solution thereof which comprises contacting said acidic aqueous solution with a selective solvent for tetravalent uranium comprising a phosphate ester of a saturated monohydric alcohol, prepared by the method of claim 1, whereby said tetravalent uranium is extracted into said selective solvent, separating the uranium-rich selective solvent from the contacted aqueous solution, contacting said uranium-rich selective solvent with a saturated aqueous solution of ammonium bicarbonate, whereby the uranium values are precipitated in the aqueous phase, and recovering said uranium values from the aqueous phase.

8. A process for recovering tetravalent uranium from an acidic aqueous solution thereof obtained by digesting phosphate ore with sulfuric acid, which comprises contacting said acidic aqueous solution with a selective solvent for tetravalent uranium comprising an extender and a phosphate ester of a saturated monohydric alcohol, prepared by the method of claim 1, whereby said tetravalent uranium is extracted into said selective solvent, separating the uranium-rich extract from the contacted aqueous solution, precipitating and removing calcium from said extract in the form of calcium sulfate, contacting the calcium-depleted extract with a saturated aqueous solution of ammonium bicarbonate, whereby the uranium values are precipitated in the aqueous phase, separating the depleted organic phase from the aqueous phase, the latter containing the precipitated uranium, separating the uranium therefrom, reconstituting and recycling the saturated aqueous ammonium bicarbonate solution, adjusting the pH of the depleted organic phase to below 3, and recycling said organic phase to contact an additional quantity of acidic aqueous solution of tetravalent uranium.

9. A process as in claim 8 wherein said ester is a phosphate ester of diisobutyl carbinol and said extender is kerosene.

References Cited in the file of this patent

UNITED STATES PATENTS

| | | |
|---|---|---|
| 2,485,841 | Pacyna | Oct. 25, 1949 |
| 2,676,975 | Fortess et al. | Apr. 27, 1954 |
| 2,701,258 | Brown et al. | Feb. 1, 1955 |
| 2,727,806 | Forward et al. | Dec. 20, 1955 |
| 2,743,159 | Lutz | Apr. 24, 1956 |
| 2,749,211 | Lundquist | June 5, 1956 |
| 2,767,045 | McCullough | Oct. 16, 1956 |
| 2,769,686 | McCullough et al. | Nov. 6, 1956 |